United States Patent
Wang

(10) Patent No.: US 9,940,189 B2
(45) Date of Patent: Apr. 10, 2018

(54) METHOD AND SYSTEM FOR DATA REBUILDING AND MEMORY CONTROL CIRCUIT UNIT THEREOF

(71) Applicant: PHISON ELECTRONICS CORP., Miaoli (TW)

(72) Inventor: Sheng-Han Wang, Taichung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 178 days.

(21) Appl. No.: 14/996,214

(22) Filed: Jan. 14, 2016

(65) Prior Publication Data

US 2017/0132069 A1 May 11, 2017

(30) Foreign Application Priority Data

Nov. 6, 2015 (TW) .............................. 104136614 A

(51) Int. Cl.
*G06F 11/10* (2006.01)
*G06F 11/07* (2006.01)
*G06F 12/02* (2006.01)

(52) U.S. Cl.
CPC ........ *G06F 11/0793* (2013.01); *G06F 11/073* (2013.01); *G06F 11/0751* (2013.01); *G06F 12/0246* (2013.01); *G06F 2212/1032* (2013.01); *G06F 2212/2022* (2013.01); *G06F 2212/7201* (2013.01)

(58) Field of Classification Search
CPC .................................................. G06F 11/1068
USPC ....................................................... 714/6.11
See application file for complete search history.

(56) References Cited

U.S. PATENT DOCUMENTS

| | | | | |
|---|---|---|---|---|
| 9,213,627 | B2 * | 12/2015 | Van Acht | G06F 12/0246 |
| 2008/0075019 | A1 * | 3/2008 | Petras | H04L 49/35 370/254 |
| 2009/0259800 | A1 * | 10/2009 | Kilzer | G06F 12/0246 711/103 |
| 2009/0259919 | A1 * | 10/2009 | Kilzer | G06F 11/1068 714/773 |
| 2013/0124782 | A1 | 5/2013 | Huang | |
| 2013/0275391 | A1 * | 10/2013 | Batwara | G06F 17/30085 707/689 |

(Continued)

FOREIGN PATENT DOCUMENTS

CN 103902406 7/2014

OTHER PUBLICATIONS

"Office Action of Taiwan Counterpart Application", dated Oct. 21, 2016, p. 1-p. 7.

*Primary Examiner* — Chae M Ko
(74) *Attorney, Agent, or Firm* — JCIPRNET

(57) ABSTRACT

A method and a system for data rebuilding and a memory control circuit unit thereof are provided. The method includes reading a plurality of physical-logical mapping information and a plurality of time information corresponding to the physical-logical mapping information stored in a rewritable non-volatile memory module. The method also includes sorting the plurality of physical-logical mapping information according to the plurality of time information corresponding to the physical-logical mapping information. The method further includes rebuilding a logical-physical mapping table according to the sorted plurality of physical-logical mapping information, and storing the rebuilt logical-physical mapping table into a buffer.

24 Claims, 11 Drawing Sheets

(56) References Cited

U.S. PATENT DOCUMENTS

| | | | |
|---|---|---|---|
| 2014/0089265 A1* | 3/2014 | Talagala | G06F 17/30551 707/674 |
| 2014/0258588 A1* | 9/2014 | Tomlin | G06F 12/0246 711/103 |
| 2014/0325115 A1* | 10/2014 | Ramsundar | G06F 12/0238 711/102 |
| 2015/0149697 A1* | 5/2015 | Salessi | G06F 12/1009 711/103 |
| 2016/0098344 A1* | 4/2016 | Gorobets | G06F 3/0626 711/154 |

* cited by examiner

| | physical address | logical address | writing time information | sorting time information |
|---|---|---|---|---|
| PBA(0) | PA(0-0) | LA(0) | 1 | 0 |
| | PA(0-1) | LA(1) | 1 | 0 |
| | PA(0-2) | LA(2) | 1 | 0 |
| PBA(1) | PA(1-0) | LA(3) | 2 | 0 |
| | PA(1-1) | LA(4) | 2 | 0 |
| | PA(1-2) | LA(5) | 2 | 0 |
| PBA(2) | PA(2-0) | LA(1) | 3 | 0 |
| | PA(2-1) | LA(2) | 3 | 0 |
| | PA(2-2) | LA(4) | 3 | 0 |
| PBA(3) | PA(3-0) | LA(0) | 4 | 1 |
| | PA(3-1) | LA(3) | 4 | 1 |
| | PA(3-2) | LA(5) | 4 | 1 |

1101

| physical address | logical address |
|---|---|
| LA(0) | PA(3-0) |
| LA(1) | PA(2-0) |
| LA(2) | PA(2-1) |
| LA(3) | PA(3-1) |
| LA(4) | PA(2-2) |
| LA(5) | PA(3-2) |

METHOD AND SYSTEM FOR DATA REBUILDING AND MEMORY CONTROL CIRCUIT UNIT THEREOF

CROSS-REFERENCE TO RELATED APPLICATION

This application claims the priority benefit of Taiwan application serial no. 104136614, filed on Nov. 6, 2015. The entirety of the above-mentioned patent application is hereby incorporated by reference herein and made a part of this specification.

BACKGROUND

1. Technology Field

The present invention relates to a data rebuilding method and system for rebuilding a mapping table and a memory control circuit unit thereof.

2. Description of Related Art

The market of digital cameras, mobile phones, and MP3 players has expanded rapidly in recent years, resulting in consumers' escalating demand for storage media. The characteristics of data non-volatility, low power consumption, compact size, and no mechanical structure make the rewritable non-volatile memory module (e.g. flash memory) ideal for being built in the portable multi-media devices as cited above.

For accessing data, the memory storage device that uses the rewritable non-volatile memory module as the storage medium records the mapping relationship between logical addresses and physical addresses in a logical-physical mapping table. Generally, when data is written to the memory storage device, mapping information in the logical-physical mapping table is updated accordingly. However, if the memory storage device has been used for some time, physical erasing units in the rewritable non-volatile memory module may be damaged due to human factors or other reasons. If the damaged physical erasing units are the ones that store the logical-physical mapping table, the data stored in the memory storage device cannot be accessed normally. Therefore, how to rebuild the logical-physical mapping table to retrieve the data in the memory storage device is an issue concerning persons skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a data rebuilding method, a data rebuilding system, and a memory control circuit unit thereof for rebuilding a logical-physical mapping table based on existing physical-logical mapping information when the logical-physical mapping table is damaged due to damage of a rewritable non-volatile memory module, so as to identify data stored in the rewritable non-volatile memory module.

An exemplary embodiment of the present invention provides a data rebuilding method for a memory storage device having a rewritable non-volatile memory module, which includes a plurality of physical erasing units. The data rebuilding method includes reading physical-logical mapping information and time information corresponding to the physical-logical mapping information stored in the rewritable non-volatile memory module, and sorting the physical-logical mapping information according to the time information. The data rebuilding method further includes building logical-physical mapping information according to the sorted physical-logical mapping information to generate a logical-physical mapping table, and storing the logical-physical mapping table in a buffer of the memory storage device.

An exemplary embodiment of the present invention provides a memory control circuit unit disposed in a memory storage device for controlling a rewritable non-volatile memory module of the memory storage device, wherein the rewritable non-volatile memory module includes a plurality of physical erasing units. The memory control circuit unit includes a host interface, a memory interface, and a memory management circuit. The host interface is coupled to a host system. The memory interface is coupled to the rewritable non-volatile memory module. The memory management circuit is coupled to the host interface and the memory interface. The memory management circuit reads physical-logical mapping information and time information corresponding to the physical-logical mapping information stored in the rewritable non-volatile memory module, and sorts the physical-logical mapping information according to the time information. The memory management circuit further builds logical-physical mapping information according to the sorted physical-logical mapping information to generate a logical-physical mapping table, and stores the logical-physical mapping table in a buffer of the memory storage device.

An exemplary embodiment of the invention provides a data rebuilding system, which includes a host system and a memory storage device. The host system includes a data rebuilding unit. The memory storage device includes a connection interface unit, a rewritable non-volatile memory module, and a memory control circuit unit. The connection interface unit is coupled to the host system. The rewritable non-volatile memory module includes a plurality of physical erasing units. The memory control circuit unit is coupled to the connection interface unit and the rewritable non-volatile memory module. The data rebuilding unit transmits at least one read command to the memory storage device, and the memory control circuit unit reads physical-logical mapping information and time information corresponding to the physical-logical mapping information stored in the rewritable non-volatile memory module according to the read command to respond to the read command. The data rebuilding unit also sorts the physical-logical mapping information according to the time information. The data rebuilding unit further builds logical-physical mapping information according to the sorted physical-logical mapping information to generate a logical-physical mapping table, and stores the logical-physical mapping table in a buffer of the memory storage device.

Based on the above, when the rewritable non-volatile memory module is damaged, causing the logical-physical mapping table to become unaccessible, the logical-physical mapping table required for accessing the data is rebuilt based on the physical-logical mapping information stored in the rewritable non-volatile memory module. Moreover, the rebuilt logical-physical mapping table is stored in the buffer of the memory storage device for access, so as to correctly read the data stored in the rewritable non-volatile memory module.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11 is a schematic diagram showing building a logical-physical mapping table according to an exemplary embodiment.

DESCRIPTION OF THE EMBODIMENTS

Figure 1:
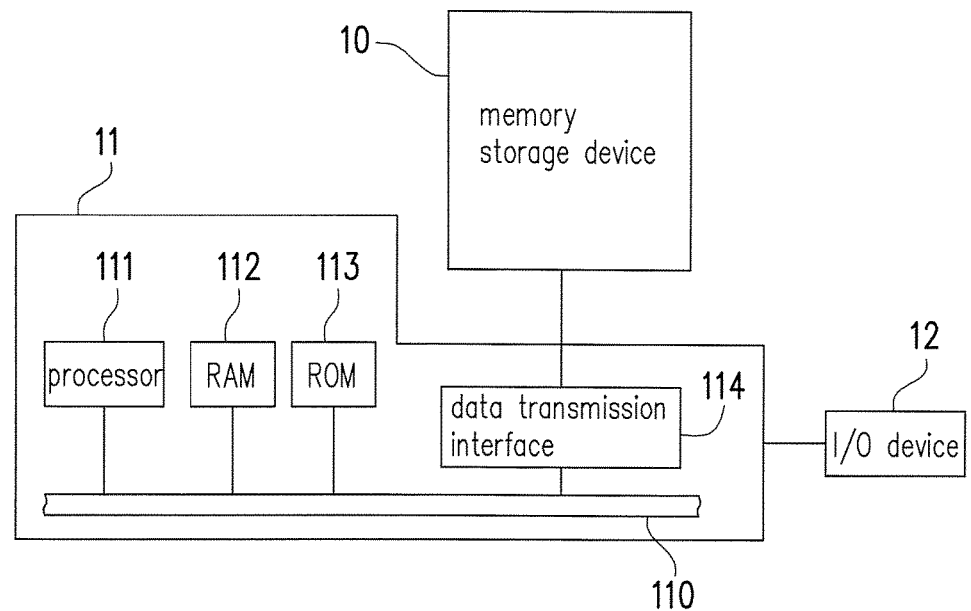
FIG. 1 is a schematic diagram showing a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also called a memory storage system) includes a rewritable non-volatile memory module and a controller (also called a control circuit unit). The memory storage device is usually used together with a host system, such that the host system can write data into or read data from the memory storage device.

Figure 2:
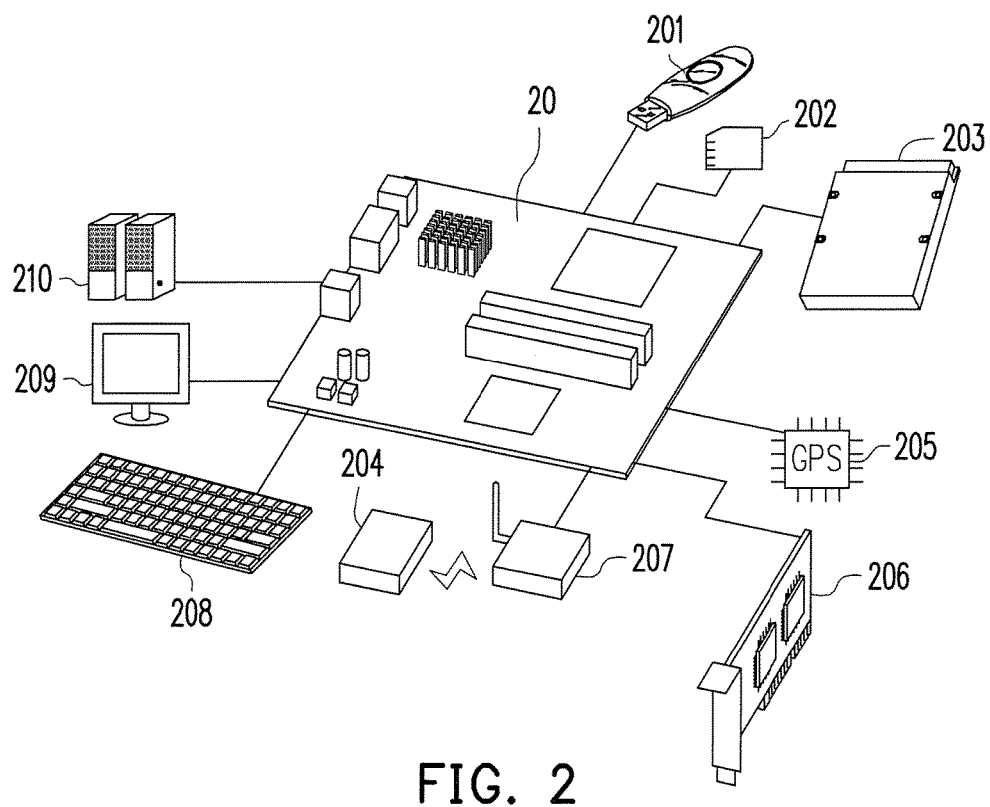
FIG. 2 is a schematic diagram showing a computer, an I/O device, and a memory storage device according to an exemplary embodiment.

FIG. 1 is a schematic diagram showing a host system, a memory storage device, and an input/output (I/O) device according to an exemplary embodiment. FIG. 2 is a schematic diagram showing a host system, a memory storage device, and an I/O device according to another exemplary embodiment.

Referring to FIG. 1 and FIG. 2, a host system 11 includes a processor 111, a random access memory (RAM) 112, a read only memory (ROM) 113, and a data transmission interface 114. The processor 111, the random access memory 112, the read only memory 113, and the data transmission interface 114 are coupled to a system bus 110.

In this exemplary embodiment, the host system 11 is coupled to a memory storage device 10 through the data transmission interface 114. For example, the host system 11 may write data to or read data from the memory storage device 10 through the data transmission interface 114. In addition, the host system 11 is coupled to an I/O device 12 through the system bus 110. For example, the host system 11 may transmit an output signal to or receive an input signal from the I/O device 12 through the system bus 110.

In this exemplary embodiment, the processor 111, the random access memory 112, the read only memory 113, and the data transmission interface 114 are disposed on a motherboard 20 of the host system 11. One or more data transmission interfaces 114 may be provided. Through the data transmission interface 114, the motherboard 20 may be coupled to the memory storage device 10 in a wired or wireless manner. The memory storage device 10 may be a flash drive 201, a memory stick 202, a solid state drive (SSD) 203, or a wireless memory storage device 204, for example. The wireless memory storage device 204 may be a memory storage device based on a variety of wireless communication technologies, such as a near field communication (NFC) memory storage device, a wireless fidelity (WiFi) memory storage device, a Bluetooth memory storage device or a Bluetooth low energy memory storage device (e.g. iBeacon), and so on. In addition, the motherboard 20 may be coupled to an I/O device of any kind, such as a global positioning system (GPS) module 205, a network interface card 206, a wireless transmission device 207, a keyboard 208, a monitor 209, a speaker 210, etc., through the system bus 110. For example, in an exemplary embodiment, the motherboard 20 may access the wireless memory storage device 204 through the wireless transmission device 207.

Figure 3:
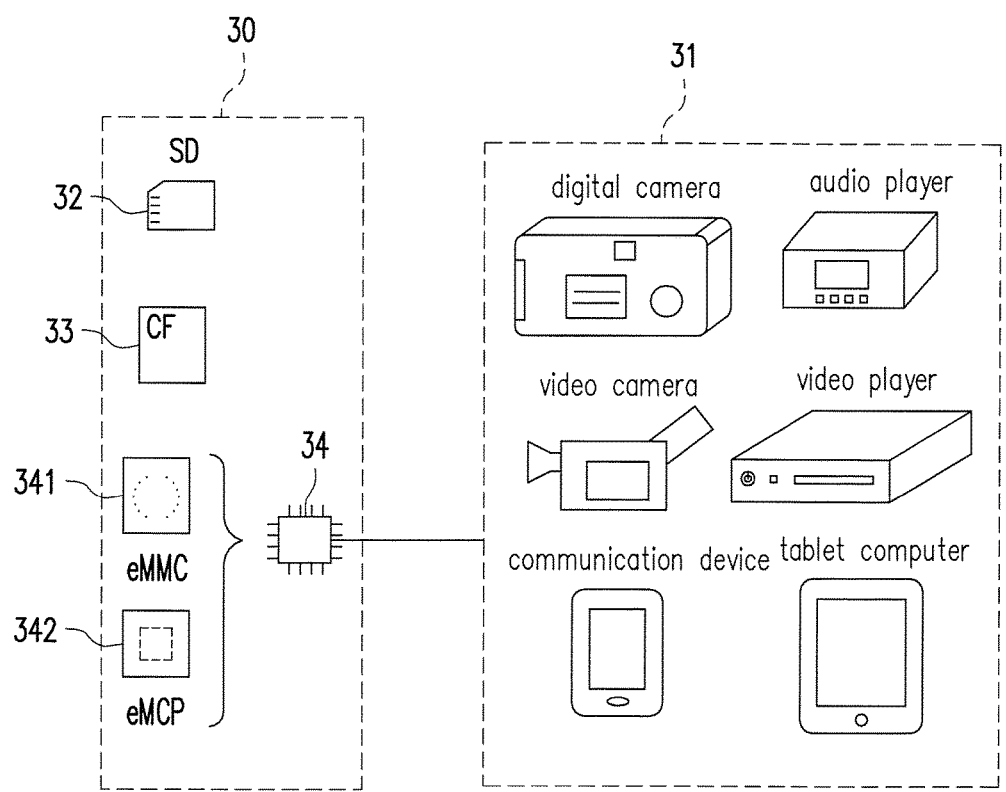
FIG. 3 is a schematic diagram showing a host system and a memory storage device according to an exemplary embodiment of the invention.

In an exemplary embodiment, the host system may be any system substantially capable of being used a the memory storage device to store data. Even though the host system is described as a computer system in the exemplary embodiment, FIG. 3 is a schematic diagram showing a host system and a memory storage device according to another exemplary embodiment. Referring to FIG. 3, in another exemplary embodiment, a host system 31 may also be a system such as a digital camera, a video camera, a communication device, an audio player, a video player, a tablet computer, etc., and a memory storage device 30 may be a non-volatile memory storage device of any kind, such as a secure digital (SD) card 32, a compact flash (CF) card 33, an embedded storage device 34, etc. The embedded storage device 34 includes an embedded storage device of any kind, where a memory module of any kind is directly coupled to a substrate of the host system, such as an embedded multimedia card (eMMC) 341 and/or an embedded multi-chip package (eMCP) storage device 342.

Figure 4:
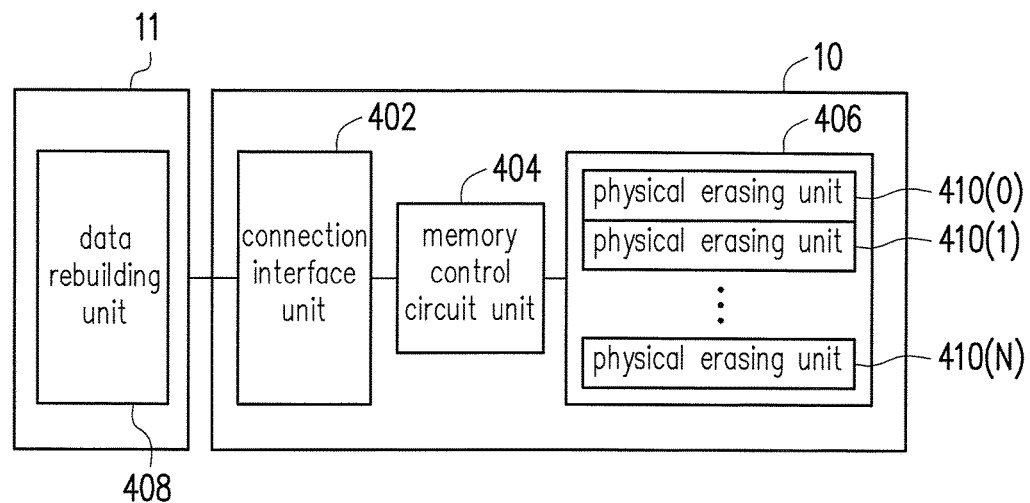
FIG. 4 is a schematic block diagram showing a host system and a memory storage device according to an exemplary embodiment.

FIG. 4 is a schematic block diagram showing a host system and a memory storage device according to an exemplary embodiment.

Referring to FIG. 4, the memory storage device 10 includes a connection interface unit 402, a memory control circuit unit 404, and a rewritable non-volatile memory module 406.

In the exemplary embodiment, the connection interface unit 402 is compatible with the serial advanced technology attachment (SATA) standard. However, the invention is not limited thereto. The connection interface unit 402 may also be compatible with the parallel advanced technology attachment (PATA) standard, the Institute of Electrical and Electronic Engineers (IEEE) 1394 standard, the peripheral component interconnect express (PCI Express) standard, the universal serial bus (USB) standard, the ultra high speed-I (UHS-I) interface standard, the ultra high speed-II (UHS-II) interface standard, the secure digital (SD) interface standard, the memory stick (MS) interface standard, the multi-chip package interface standard, the multimedia card (MMC) interface standard, the embedded multimedia card (eMMC) interface standard, the universal flash storage (UFS) interface standard, the embedded multi-chip package (eMCP) interface standard, the compact flash (CF) interface standard, the integrated device electronics (IDE) standard, or other suitable standards. In this exemplary embodiment, the connection interface unit 402 may be packaged with the memory control circuit unit 404 within the same chip, or the connection interface unit 402 may be disposed outside a chip that includes the memory control circuit unit 404.

The memory control circuit unit 404 is configured for executing a plurality of logic gates or control commands implemented in a hardware form or a firmware form, and performing various operations, such as data writing, data reading, or data erasing, in the rewritable non-volatile memory module 406 according to a command of the host system 11.

The rewritable non-volatile memory module 406 is coupled to the memory control circuit unit 404 for storing data written by the host system 11. The rewritable non-volatile memory module 406 includes physical erasing units 410(0)-410(N). For example, the physical erasing units 410(0)-410(N) may belong to the same or different memory dies. Each of the physical erasing units includes a plurality of physical programming units, and the physical programming units belonging to the same physical erasing unit may be written independently or erased simultaneously. However, it should be noted that the invention is not limited thereto. Each physical erasing unit may be composed of 64, 256, or any number of physical programming units.

To be more specific, the physical erasing unit is the smallest unit for erasing. That is to say, each physical erasing unit has a minimum number of memory cells for being erased together. The physical programming unit is the smallest unit for programming. That is, the physical programming unit is the smallest unit for writing data. Each physical programming unit usually includes a data bit area and a redundant bit area. The data bit area includes a plurality of physical access addresses for storing user data, and the redundant bit area is configured for storing system data (e.g. control information and an error correcting code). In this exemplary embodiment, the data bit area of each physical programming unit includes 8 physical access addresses, and one physical access address is 512 bytes. However, in other exemplary embodiments, the data bit area may include more or fewer physical access addresses. The invention is not intended to limit the size and number of the physical access addresses. For example, in an exemplary embodiment, the physical erasing unit is a physical block and the physical programming unit is a physical page or a physical sector, but the invention is not limited thereto.

In this exemplary embodiment, the rewritable non-volatile memory module 406 is a Multi Level Cell (MLC) NAND flash memory module (i.e. a flash memory module in which one memory cell stores 2 bits of data). However, the invention is not limited thereto. The rewritable non-volatile memory module 406 may be a Single Level Cell (SLC) NAND flash memory module (i.e. a flash memory module in which one memory cell stores 1 bit of data), a Triple Level Cell (TLC) NAND flash memory module (i.e. a flash memory module in which one memory cell stores 3 bits of data), other types of flash memory modules, or other memory modules having the same characteristics.

In this exemplary embodiment, the host system 11 transmits a control command to the memory storage device 10 by a data rebuilding unit 408 so as to rebuild data, and the memory control circuit unit 404 executes a corresponding operation in response to the command received from the host system. For example, the data rebuilding unit 408 includes a data rebuilding application implemented by a software code, which may operate in an operation system (OS) of the host system 11. In this exemplary embodiment, the operation system of the host system 11 is the Microsoft Windows operation system. However, it should be understood that the invention is not limited thereto and the invention may also be applied to Linux, Mac, or other operation systems.

Figure 5:
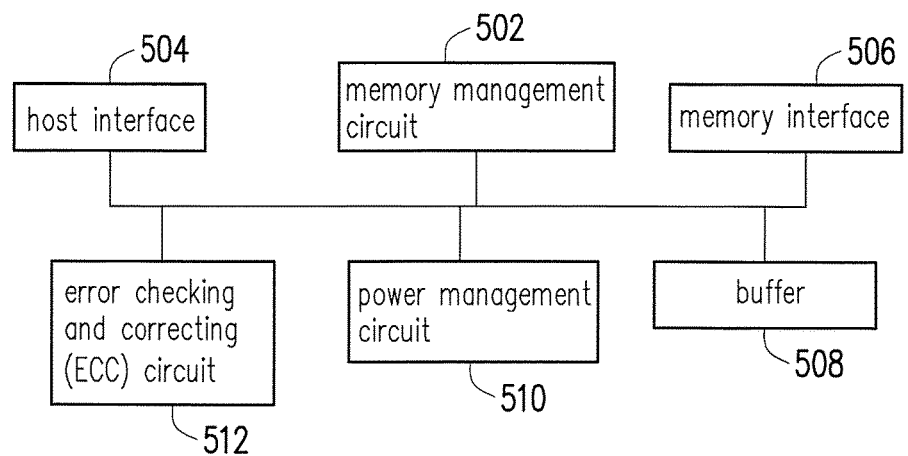
FIG. 5 is a schematic block diagram showing a memory control circuit unit according to an exemplary embodiment.

FIG. 5 is a schematic block diagram showing a memory control circuit unit according to an exemplary embodiment.

Referring to FIG. 5, the memory control circuit unit 404 includes a memory management circuit 502, a host interface 504, a memory interface 506, a buffer 508, a power management circuit 510, and an error checking and correcting (ECC) circuit 512.

The memory management circuit 502 is configured for controlling the overall operation of the memory control circuit unit 404. Specifically, the memory management circuit 502 has a plurality of control commands. When the memory storage device 10 is operated, the control commands are executed to performing various operations such as data writing, data reading, and data erasing.

In this exemplary embodiment, the control commands of the memory management circuit 502 are implemented in a firmware form. For example, the memory management circuit 502 has a microprocessor unit (not shown) and a read-only memory (not shown), and the control commands are burnt into the read-only memory. When the memory storage device 10 is operated, the control commands are executed by the microprocessor unit for performing various operations, such as data writing, data reading, and data erasing.

In another exemplary embodiment, the control commands of the memory management circuit 502 may also be stored in a specific region (for example, the system area in the memory module exclusively used for storing system data) of the rewritable non-volatile memory module 406 as program codes. Moreover, the memory management circuit 502 has the microprocessor unit (not shown), the read-only memory (not shown), and a random access memory (not shown). Particularly, the read-only memory has a boot code. When the memory control circuit unit 404 is enabled, the boot code is first executed by the microprocessor unit for loading the control commands stored in the rewritable non-volatile memory module 406 into the random access memory of the memory management circuit 502. Afterwards, the microprocessor unit executes the control commands for performing various operations, such as data writing, data reading, and data erasing.

Additionally, in another exemplary embodiment, the control commands of the memory management circuit 502 may be implemented in a hardware form. For example, the memory management circuit 502 includes a microcontroller, a memory cell management circuit, a memory writing circuit, a memory reading circuit, a memory erasing circuit, and a data processing circuit. The memory management circuit, the memory writing circuit, the memory reading circuit, the memory erasing circuit, and the data processing circuit are coupled to the microcontroller. The memory management circuit is configured for managing the physical erasing units of the rewritable non-volatile memory module 406; the memory writing circuit is configured for issuing a write command to the rewritable non-volatile memory module 406 in order to write data to the rewritable non-volatile memory module 406; the memory reading circuit is configured for issuing a read command to the rewritable non-volatile memory module 406 in order to read data from the rewritable non-volatile memory module 406; the memory erasing circuit is configured for issuing an erase command to the rewritable non-volatile memory module 406 in order to erase data from the rewritable non-volatile memory module 406; and the data processing circuit is configured for processing both the data to be written to the rewritable non-volatile memory module 406 and the data read from the rewritable non-volatile memory module 406.

The host interface 504 is coupled to the memory management circuit 502 for coupling to the connection interface unit 402 to receive and identify commands and data transmitted by the host system 11. In other words, the commands and data sent by the host system 11 are transmitted to the memory management circuit 502 through the host interface 504. In this exemplary embodiment, the host interface 504 is compatible to the SATA standard. However, it should be understood that the invention is not limited thereto, and the host interface 504 may also be compatible to the PATA standard, the IEEE 1394 standard, the PCI Express standard, the USB standard, the UHS-I standard, the UHS-II standard, the SD standard, the MS standard, the MMC standard, the CF standard, the IDE standard, or other suitable data transmission standards.

The memory interface 506 is coupled to the memory management circuit 502 and configured for accessing the rewritable non-volatile memory module 406. In other words, the data to be written to the rewritable non-volatile memory module 406 is converted to a format acceptable to the rewritable non-volatile memory module 406 by the memory interface 506.

The buffer 508 is coupled to the memory management circuit 502 and configured for temporarily storing data and commands from the host system 11 or data from the rewritable non-volatile memory module 406.

The power management circuit 510 is coupled to the memory management circuit 502 and configured for controlling the power of the memory storage device 10.

The error checking and correcting (ECC) circuit 512 is coupled to the memory management circuit 502 and configured for executing an error checking and correcting procedure to ensure correctness of data. To be more specific, when the memory management circuit 502 receives a write command from the host system 11, the error checking and correcting (ECC) circuit 512 generates an error checking and correcting (ECC) code for the data corresponding to the write command, and the memory management circuit 502 writes the data corresponding to the write command and the corresponding ECC code to the rewritable non-volatile memory module 406. Subsequently, when the memory management circuit 502 reads the data from the rewritable non-volatile memory module 406, the corresponding ECC code is also read by the rewritable non-volatile memory module 406 simultaneously, and the ECC circuit 512 executes the error checking and correcting procedure for the read data based on the ECC code.

Figure 6:
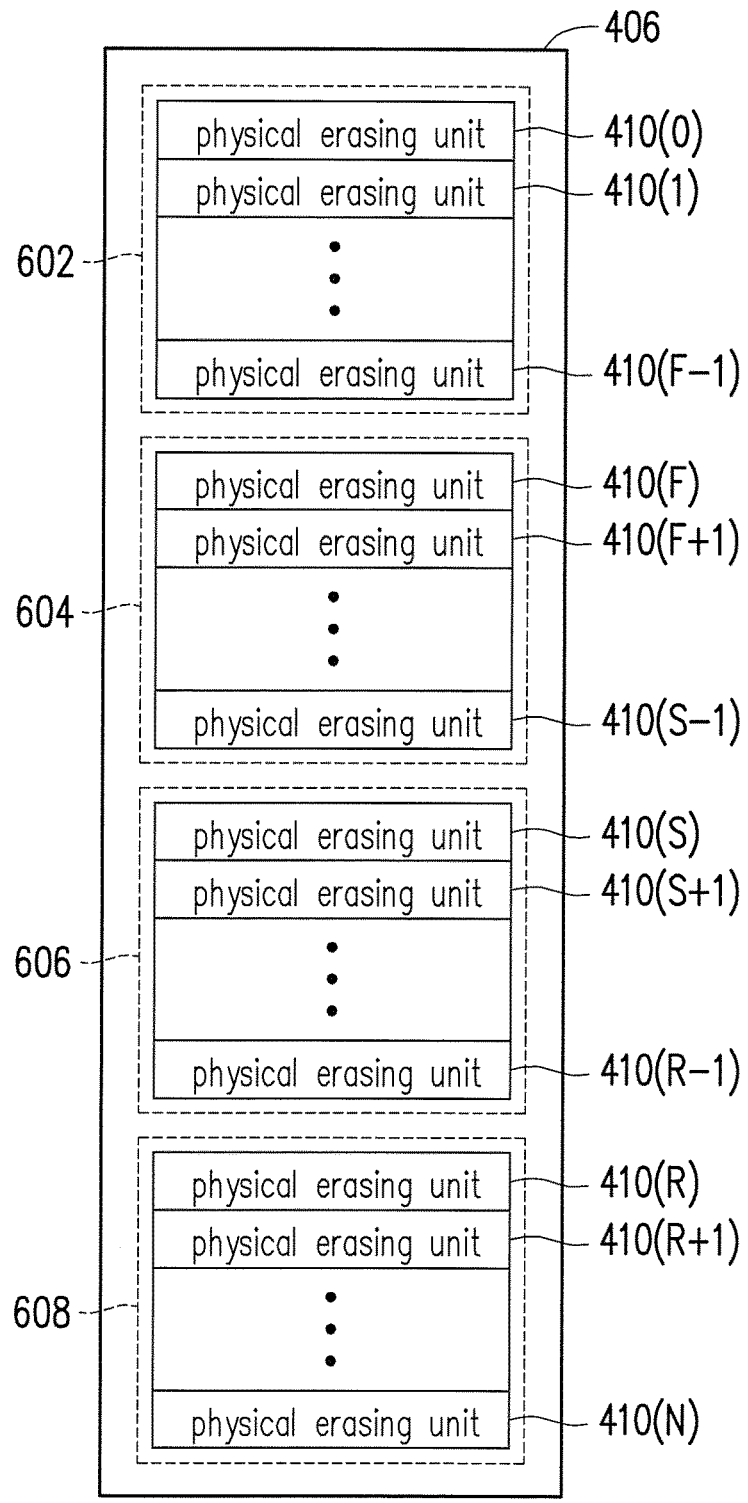
FIG. 6 and FIG. 7 are exemplary diagrams showing management of physical erasing units according to an exemplary embodiment.
Figure 7:
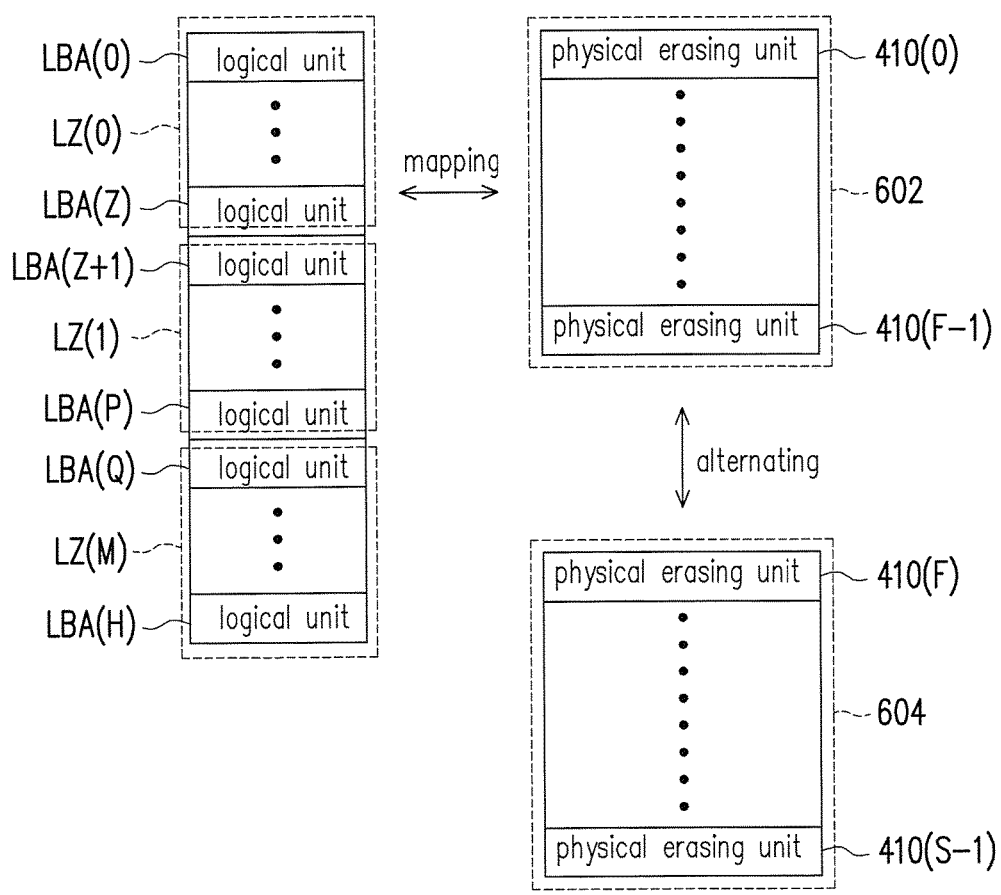

FIG. 6 and FIG. 7 are exemplary diagrams showing management of the physical erasing units according to an exemplary embodiment.

It should be understood that terms, such as "get," "group," "divide," "associate," and so forth, are logical concepts which describe operations on the physical erasing units of the rewritable non-volatile memory module 406. That is, the physical erasing units of the rewritable non-volatile memory module are logically operated, and the actual positions of the physical erasing units are not changed.

Referring to FIG. 6, the memory control circuit unit 404 (or the memory management circuit 502) logically groups the physical erasing units 410(0)-410(N) into a data area 602, an spare area 604, a system area 606, and a replacement area 608.

The physical erasing units logically belonging to the data area 602 and the spare area 604 are used for storing the data from the host system 11. Specifically, the physical erasing units of the data area 602 are considered as physical erasing units that have stored data therein, and the physical erasing units of the spare area 604 are used for replacing the physical erasing units of the data area 602. That is, when receiving the write command and the data to be written from the host system 11, the memory management circuit 502 gets a physical erasing unit from the spare area 604 and writes the data to the gotten physical erasing unit in place of the physical erasing units of the data area 602.

The physical erasing units logically belonging to the system area 606 are used for storing system data. For example, the system data includes the manufacturer and model number of the rewritable non-volatile memory module, the number of physical erasing units of the rewritable non-volatile memory module, the number of physical programming units of each physical erasing unit, and so on.

The physical erasing units logically belonging to the replacement area 608 are used for replacing damaged physical erasing units in a damaged physical erasing unit replacement operation. Specifically, if the replacement area 608 still has normal physical erasing units and a physical erasing unit of the data area 602 is damaged, the memory management circuit 502 gets the normal physical erasing unit from the replacement area 608 to replace the damaged physical erasing unit.

Particularly, the numbers of the physical erasing units of the data area 602, the spare area 604, the system area 606, and the replacement area 608 vary according to different memory types. In addition, it should be understood that, during the operation of the memory storage device 10, the grouping of the physical erasing units to the data area 602, the spare area 604, the system area 606, and the replacement area 608 varies dynamically. For instance, when a physical erasing unit in the spare area 604 is damaged and replaced by the physical erasing unit in the replacement area 608, the physical erasing unit that is originally grouped to the replacement area 608 is associated to the spare area 604.

Referring to FIG. 7, the memory control circuit unit 404 (or the memory management circuit 502) disposes logical units LBA(0)-LBA(H) to map to the physical erasing units of the data area 602, wherein each of the logical units includes a plurality of logical sub-units to map to the physical programming units of the corresponding physical erasing unit. Moreover, when the host system 11 writes data to the logical units or updates the data stored in the logical units, the memory control circuit unit 404 (or the memory management circuit 502) retrieves one physical erasing unit from the spare area 604 for writing the data in place of the physical erasing unit of the data area 602. In this exemplary embodiment, the logical sub-unit may be a logical page or a logical sector.

In order to identify the physical erasing unit to which the data of each logical unit is stored, in this exemplary embodiment, the memory control circuit unit 404 (or the memory management circuit 502) records the mapping between the logical unit and the physical erasing unit. Moreover, when the host system 11 accesses data in the logical sub-unit, the memory control circuit unit 404 (or the memory management circuit 502) confirms the logical unit to which the logical sub-unit belongs and accesses the data in the physical erasing unit to which the logical unit is mapped. For example, in this exemplary embodiment, the memory control circuit unit 404 (or the memory management circuit 502) stores a logical-physical mapping table in the rewritable non-volatile memory module 406 for recording the physical erasing unit to which each logical unit is mapped, and when accessing data, the memory control circuit unit 404 (or the memory management circuit 502) loads the logical-physical mapping table to the buffer 508 for maintenance.

It should be noted that, because the buffer 508 has limited capacity and cannot store a mapping table that records the mapping relationship of all logical units, in this exemplary embodiment, the memory control circuit unit 404 (or the memory management circuit 502) groups the logical units LBA(0)-LBA(H) into a plurality of logical regions LZ(0)-LZ(M) and assigns one logical-physical mapping table to each logical region. Particularly, when the memory control circuit unit 404 (or the memory management circuit 502) updates the mapping of a certain logical unit, the logical-physical mapping table corresponding to the logical region to which this logical unit belongs is loaded to the buffer member 508 to be updated.

In this exemplary embodiment, the rewritable non-volatile memory module 406 of the memory storage device 10 is managed based on the physical programming units (also called page-based). For example, when a write command is executed, regardless of the logical programming unit to which the logical unit corresponds for writing the current data, the memory control circuit unit 404 (or the memory management circuit 502) writes the data to the physical programming units one by one (also called a random writing mechanism). Specifically, the below-described random writing mechanism gets an empty physical erasing unit from the spare area 504 to serve as the currently used physical erasing unit (also called an active physical erasing unit) for writing the data. When the currently used physical erasing unit is filled with data, the memory control circuit unit 404 (or the memory management circuit 502) gets another empty physical erasing unit from the spare area 504 to serve as the currently used physical erasing unit for continuing writing the data.

In this exemplary embodiment, the memory control circuit unit 404 (or the memory management circuit 502) also defines a region in the buffer 508 for recording a plurality of physical-logical mapping information. The physical-logical mapping information records the mapping relationship between physical units for storing data and logical units. Then, the memory control circuit unit 404 (or the memory management circuit 502) re-stores the physical-logical mapping information recorded in the buffer 508 to the rewritable non-volatile memory module 406. For example, if data is written to a certain physical erasing unit in the spare area 504, accordingly the physical-logical mapping information corresponding to the data is first recorded in the buffer 508 and then stored to the physical programming unit in this physical erasing unit.

Particularly, in this exemplary embodiment, time information related to the physical-logical mapping information is stored in the physical erasing unit as well to indicate the time of generation of the physical-logical mapping information. For example, the time information may be set according to the time that the data is written to the physical erasing unit, or the time that the physical-logical mapping information is written to the physical erasing unit. In addition, the memory control circuit unit 404 (or the memory management circuit 502) stores the physical-logical mapping information in the data bit area of the physical erasing unit and stores the time information corresponding to the physical-logical mapping information in the redundant bit area of the physical erasing unit.

Figure 8:
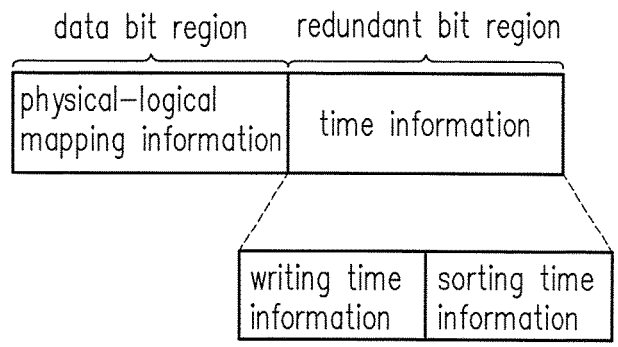
FIG. 8 is a schematic diagram showing physical-logical mapping information and time information stored in the physical erasing unit according to an exemplary embodiment.

FIG. 8 is a schematic diagram showing the physical-logical mapping information and time information stored in the physical erasing unit according to an exemplary embodiment.

Referring to FIG. 8, the physical-logical mapping information is stored in the data bit area of the physical erasing unit and includes info nation indicating the mapping relationship between the physical unit and the logical unit, and the time information is stored in the redundant bit area of the physical erasing unit and includes the time indicating and corresponding to this mapping relationship. In this exemplary embodiment, the physical-logical mapping information stored in the physical erasing unit records a logical address to which the physical erasing unit is mapped, and the actual mapping relationship is identified according to an actual storage address of the logical address in the physical erasing unit. However, in another exemplary embodiment, the physical-logical mapping information may include information different from the aforementioned, or the mapping relationship between the physical unit and the logical unit may be identified by a different determination method.

Moreover, in this exemplary embodiment, the time information may include writing time information and sorting time information. The writing time information and the sorting time information may be set to preset values. When a general writing operation is executed and requires to store the physical-logical mapping information, the memory control circuit unit 404 (or the memory management circuit 502) sets the writing time information of the physical-logical mapping information corresponding to the executing time of the general writing operation. In addition, when a data sorting operation is executed in background (e.g. data consolidation or garbage collection) and requires to store the physical-logical mapping information, the memory control circuit unit 404 (or the memory management circuit 502) further sets the sorting time information of the physical-logical mapping information corresponding to the executing time of the data sorting operation.

For example, corresponding to the general writing operation, the writing time information of the physical-logical mapping information is updated. Corresponding to the data sorting operation executed in background, not only the writing time information of the physical-logical mapping information but also the sorting time information of the physical-logical mapping information are updated. The time information may be set to ascending sequential values (e.g. 1, 2, 3, and so on) according to the executing time of the operation. For example, the preset values of the writing time information and the sorting time information are 0. Corresponding to the general writing operation, the corresponding writing time information may be sequentially set to sequential values, e.g. 1, 2, 3, and so on, according to the executing time of the general writing operation. Corresponding to the data sorting operation, the corresponding sorting time information may be sequentially set to sequential values, e.g. 1, 2, 3, and so on, according to the executing time of the data sorting operation. Moreover, in another exemplary embodiment, the sorting time information may be reset after the data sorting operation is completed. For example, it is assumed that the corresponding sorting time information is sequentially set to 1, 2, and 3 according to the executing time of the data sorting operation. The corresponding sorting time information will be set starting from 1 when the next data sorting operation is executed.

It should be noted that, although the time information includes both the writing time information and the sorting time information in this exemplary embodiment, the time information may include only the writing time information and not include the sorting time information in another exemplary embodiment.

Figure 9:
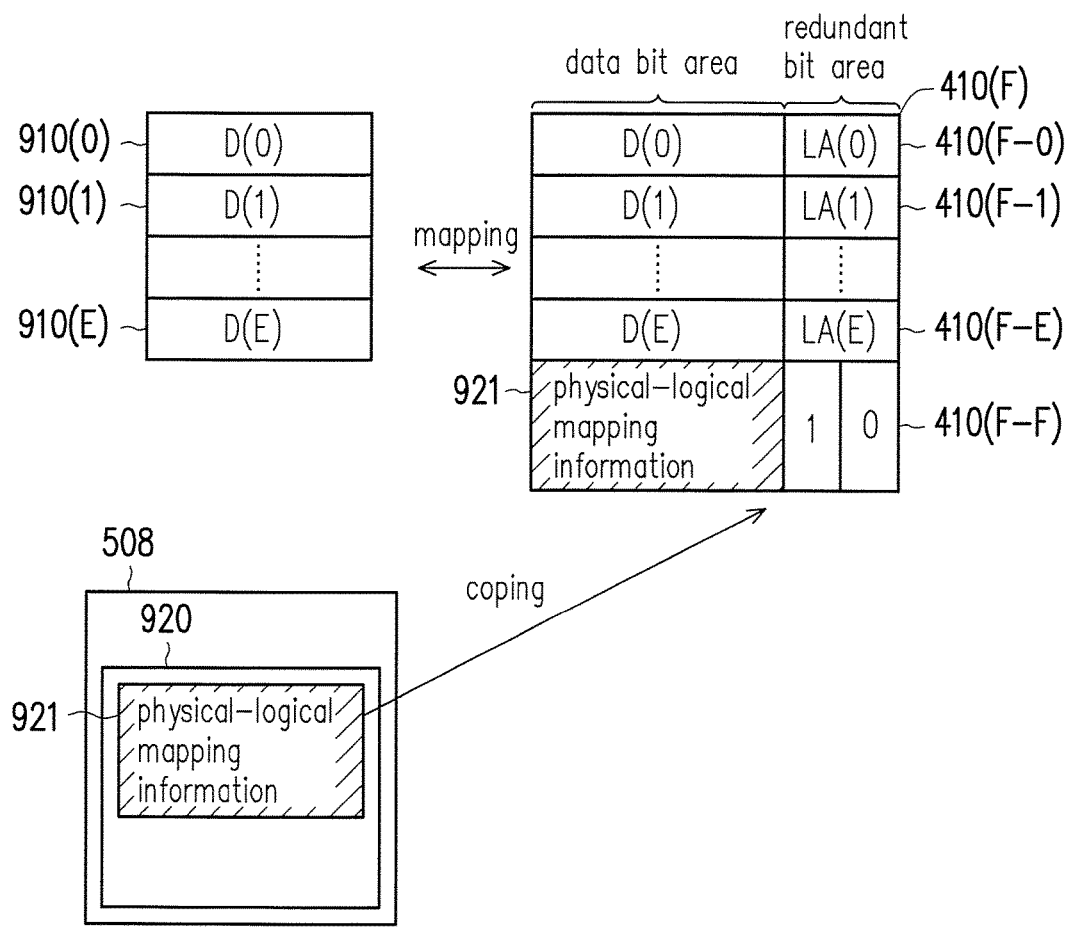
FIG. 9 is a schematic diagram showing storing physical-logical mapping information corresponding to a general writing operation according to an exemplary embodiment.

FIG. 9 is a schematic diagram showing storing the physical-logical mapping information corresponding to the general writing operation according to an exemplary embodiment.

Referring to FIG. 9, the memory control circuit unit 404 (or the memory management circuit 502) receives a write command and written data D(0)-D(E) corresponding to the write command. In this exemplary embodiment, it is assumed that the write command instructs to write the written data D(0)-D(E) to logical programming units 910(0)-910(E).

The memory control circuit unit 404 (or the memory management circuit 502) gets at least one physical erasing unit from the rewritable non-volatile memory module 406 for writing the written data. For example, the memory control circuit unit 404 (or the memory management circuit 502) stores the written data D(0)-D(E) in the physical programming units 410(F−0)-410(F−E) of the physical erasing unit 410(F). In this exemplary embodiment, the memory control circuit unit 404 (or the memory management circuit 502) may define a region 920 in the buffer 508. Moreover, the memory control circuit unit 404 (or the memory management circuit 502) temporarily stores physical-logical mapping information 921 corresponding to the written data D(0)-D(E) in the region 920 of the buffer 508 and then stores the physical-logical mapping information 921 recorded in the region 920 in the physical erasing unit 410(F). For example, the physical-logical mapping information 921 records logical addresses LA(0)-LA(E) of the logical programming units 910(0)-910(E) to which the written data D(0)-D(E) correspond.

Specifically, the memory control circuit unit 404 (or the memory management circuit 502) stores the written data D(0)-D(E) in the data bit areas of the physical programming units 410(F−0)-410(F−E) and records the logical addresses LA(0)-LA(E) of the logical programming units 910(0)-910(E) corresponding to the written data D(0)-D(E) in the redundant bit areas of the physical programming units 410(F−0)-410(F−E). Then, the memory control circuit unit 404 (or the memory management circuit 502) stores the physical-logical mapping information 921 in the buffer 508 to the physical programming unit 410(F−F). As shown in FIG. 9, the physical-logical mapping information 921 is stored in the data bit area of the physical programming unit 410(F−F). In this exemplary embodiment, when storing the physical-logical mapping information 921 in the data bit area of the physical programming unit 410(F−F), the memory control circuit unit 404 (or the memory management circuit 502) also stores the time information corresponding to the physical-logical mapping information 921 in the redundant bit area of the physical programming unit 410(F−F). Because this exemplary embodiment corresponds to the general writing operation, the writing time information is set to indicate the time of the physical-logical mapping information 921. For example, the writing time information is set to 1. Meanwhile, the sorting time information may be set to the preset value, e.g. 0, or set according to the actual needs, and is not particularly limited. It should be noted that the physical programming units and the logical programming units are in a one-to-one mapping relationship in this exemplary embodiment. Nevertheless, the physical programming units and the logical programming units may be in a one-to-many mapping relationship in other exemplary embodiments. For example, in a case where the written data is compressed, one physical programming unit may correspond to multiple logical programming units.

Figure 10A:
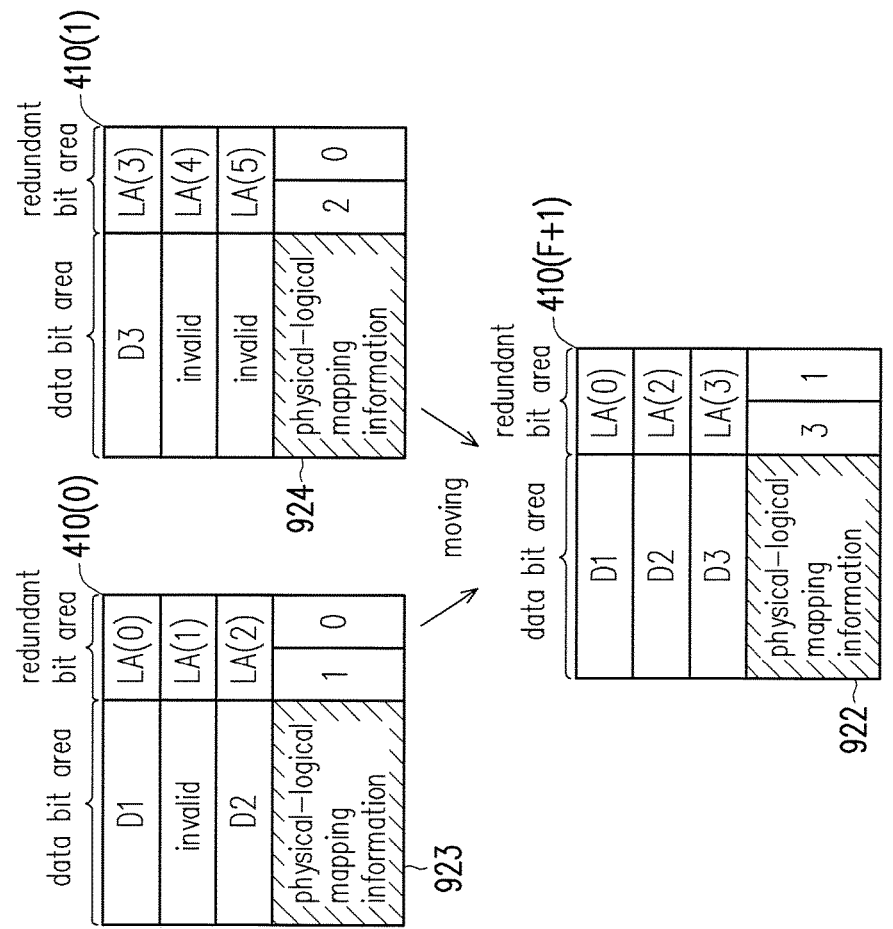
FIG. 10A is a schematic diagram showing storing physical-logical mapping information corresponding to a garbage collecting operation according to an exemplary embodiment.
Figure 10B:
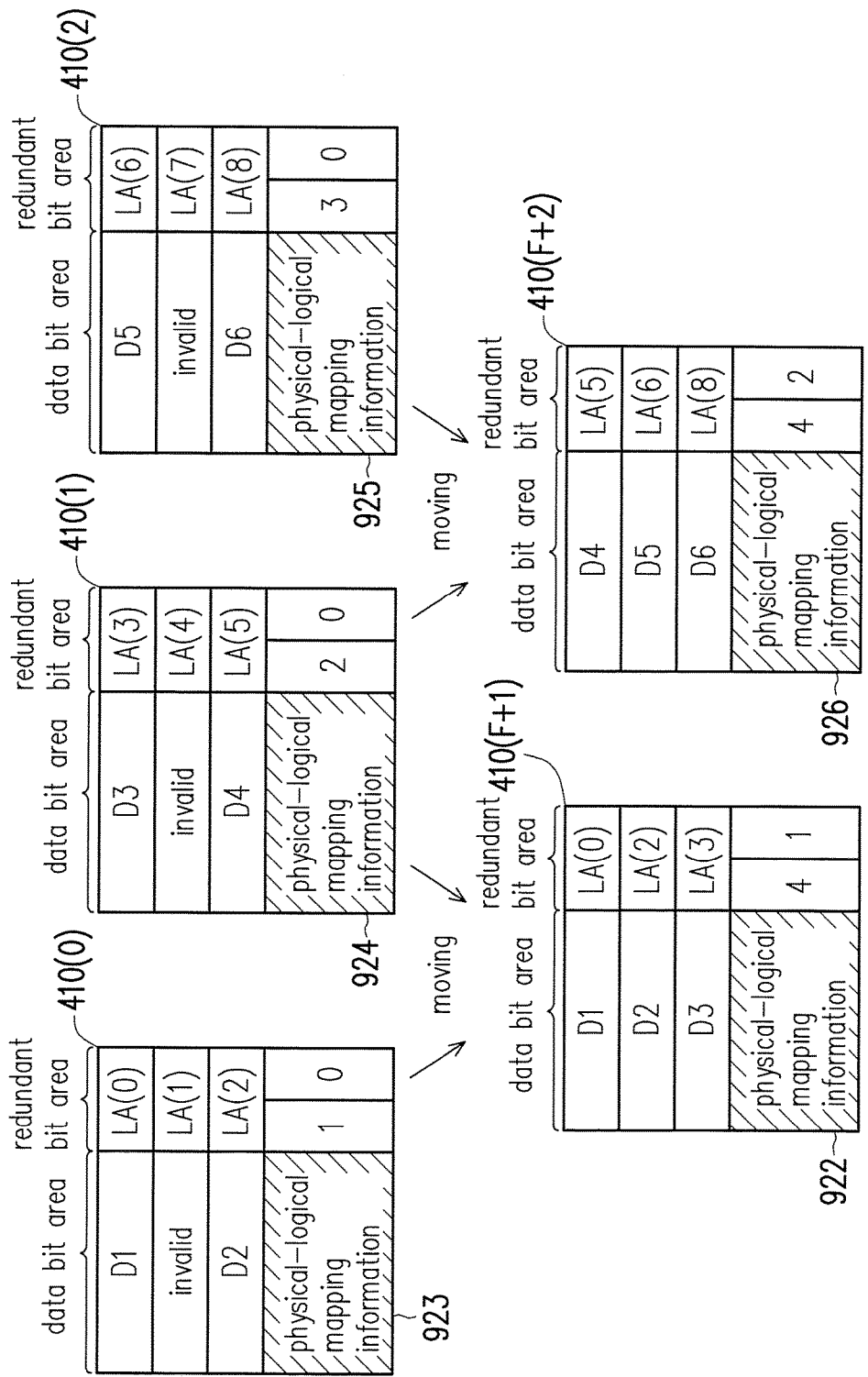
FIG. 10B is a schematic diagram showing storing physical-logical mapping information corresponding to a garbage collecting operation according to another exemplary embodiment.

FIG. 10A is a schematic diagram showing storing the physical-logical mapping information corresponding to a garbage collecting operation according to an exemplary embodiment. FIG. 10B is a schematic diagram showing storing the physical-logical mapping information corresponding to the garbage collecting operation according to another exemplary embodiment.

Referring to FIG. 10, when executing the garbage collecting operation on the physical erasing unit 410(0) and the physical erasing unit 410(1), the memory control circuit unit 404 (or the memory management circuit 502) moves valid data in the physical erasing unit 410(0) and the physical erasing unit 410(1) to another physical erasing unit. For example, the memory control circuit unit 404 (or the memory management circuit 502) stores valid data D1 and D2 in the physical erasing unit 410(0) and valid data D3 in the physical erasing unit 410(1) in the data bit area of the physical erasing unit 410(F+1). The memory control circuit unit 404 (or the memory management circuit 502) also stores the logical addresses (i.e. logical addresses LA(0), LA(2), and LA(3)) corresponding to the valid data in the redundant bit area. Moreover, the memory control circuit unit 404 (or the memory management circuit 502) stores physical-logical mapping information 922 related to the physical erasing unit 410(F+1) in the physical erasing unit 410(F+1). Therefore, the physical erasing unit 410(F+1) stores the valid data D1 and the corresponding logical address LA(0), the valid data D2 and the corresponding logical address LA(2), the valid data D3 and the corresponding logical address LA(3), and the physical-logical mapping information 922. In this exemplary embodiment, the physical-logical mapping information 922 records the logical addresses (i.e. the logical addresses LA(0), LA(2), and LA(3)) corresponding to the valid data D1, D2, and D3. Because this exemplary embodiment corresponds to the garbage collecting operation, the memory control circuit unit 404 (or the memory management circuit 502) sets the writing time information and the sorting time information to indicate the time of the physical-logical mapping information 922. For example, in this exemplary embodiment, the garbage collecting operation is completed by using only one physical erasing unit (i.e. the physical erasing unit (F+1)). Therefore, the sorting time information corresponding to the physical erasing unit (F+1) is set to 1. The writing time information may be set according to a time sequence corresponding to the general writing operation. For example, in this exemplary embodiment, the writing time information of the physical-logical mapping information 922 may be set to 3. Nevertheless, in another exemplary embodiment, the writing time information may also be set to other values according to the actual needs.

Referring to FIG. 10B, when it is required to retrieve multiple physical erasing units from the spare area for storing valid data so as to complete one garbage collecting operation (for example, two physical erasing units are gotten from the spare area for storing the valid data so as to release three physical erasing units), the memory control circuit unit 404 (or the memory management circuit 502) may sequentially set the sorting time information according to the time sequence that these physical erasing units are gotten for storing the valid data. As shown in FIG. 10B, it is assumed that the memory control circuit unit 404 (or the memory management circuit 502) needs to get the physical erasing units 410(F+1) and 410(F+2) to store the valid data of the physical erasing units 410(0), 410(1), and 410(2), so as to complete this garbage collecting operation. The memory control circuit unit 404 (or the memory management circuit 502) stores the valid data D1 and D2 of the physical erasing unit 410(0) and the valid data D3 of the physical erasing unit 410(1) in the physical erasing unit 410(F+1) and stores the physical-logical mapping information 922 in the physical erasing unit 410(F+1), and sets the writing time information to 4 and sets the sorting time information to 1. Further, the memory control circuit unit 404 (or the memory management circuit 502) stores the valid data D4 of the physical erasing unit 410(1) and the valid data D5 and D6 of the physical erasing unit 410(2) in the physical erasing unit 410(F+2) and stores the physical-logical mapping information 926 in the physical erasing unit 410(F+1), and likewise sets the writing time information to 4 and sets the sorting time information to 2. In this exemplary embodiment, the physical-logical mapping information 922 records the logical addresses (i.e. the logical addresses LA(0), LA(2), and LA(3)) corresponding to the valid data D1, D2, and D3 while the physical-logical mapping information 926 records the logical addresses (i.e. the logical addresses LA(5), LA(6), and LA(8)) corresponding to the valid data D4, D5, and D6. Moreover, it should be noted that, in this exemplary embodiment, in the process of completing one garbage collecting operation, the writing time information of all the physical erasing units gotten for storing the valid data is set to the same value.

In the above exemplary embodiment, the memory control circuit unit 404 (or the memory management circuit 502) stores the physical-logical mapping information in the buffer 508 to the related physical erasing unit. In other exemplary embodiments, however, the memory control circuit unit 404 (or the memory management circuit 502) may store the physical-logical mapping information in the buffer 508 to a special physical erasing unit. This special physical erasing unit is used exclusively for storing the physical-logical mapping information.

In this exemplary embodiment, the memory control circuit unit 404 (or the memory management circuit 502) uses the physical-logical mapping information to update the logical-physical mapping table at an appropriate time. For example, when the space of the buffer 508 for storing the physical-logical mapping information is full, the memory control circuit unit 404 (or the memory management circuit 502) updates the logical-physical mapping table according to the physical-logical mapping information in the buffer 508 and re-stores the updated logical-physical mapping table in the rewritable non-volatile memory module 406.

However, if the memory storage device 10 has been used for some time, the rewritable non-volatile memory module 406 may be damaged, resulting in that the stored logical-physical mapping table is damaged and the data cannot be accessed normally. Thus, in this exemplary embodiment, if the logical-physical mapping table is damaged, the logical-physical mapping table may be rebuilt by sorting the physical-logical mapping information of the rewritable non-volatile memory module 406, so as to identify the data stored in the rewritable non-volatile memory module (e.g. user data).

FIG. 11 is a schematic diagram showing building a logical-physical mapping table according to an exemplary embodiment.

When it is required to rebuild the data, the host system 11 gives a control command to instruct the memory control circuit unit 404 (or the memory management circuit 502) to execute a corresponding operation. For example, the memory control circuit unit 404 (or the memory management circuit 502) reads the physical-logical mapping information and the corresponding time information stored in all the physical erasing units according to a read command from the host system 11, and responds to the host system 11 with the read physical-logical mapping information and time information. Further, the host system 11 sorts the physical-logical mapping information according to the time information corresponding to the physical-logical mapping information. In this exemplary embodiment, it is assumed that the read physical-logical mapping information includes the physical-logical mapping information corresponding to physical erasing units PBA(0)-PBA(3). The physical-logical mapping information of the physical erasing unit PBA(0) includes the logical addresses LA(0), LA(1), and LA(2), and the writing time information and the sorting time information corresponding to the logical addresses LA(0), LA(1), and LA(2) are 1 and 0 respectively. The physical-logical mapping information of the physical erasing unit PBA(1) includes the logical addresses LA(3), LA(4), and LA(5), and the writing time information and the sorting time information corresponding to the logical addresses LA(3), LA(4), and LA(5) are 2 and 0 respectively. The physical-logical mapping information of the physical erasing unit PBA(2) includes the logical addresses LA(1), LA(2), and LA(4), and the writing time information and the sorting time information corresponding to LA(1), LA(2), and LA(4) are 3 and 0 respectively. The physical-logical mapping information of the physical erasing unit PBA(3) includes the logical addresses LA(0), LA(3), and LA(5), and the writing time information and the sorting time information corresponding to the logical addresses LA(0), LA(3), and LA(5) are 4 and 1 respectively. The host system 11 sorts the physical-logical address mapping information into a sorting table 1101, as shown in FIG. 11, according to the writing time information and the sorting time information. It should be noted that, in this exemplary embodiment, the corresponding relationship between the physical addresses and the logical addresses in the sorting table 1101 is merely an example of the physical-logical mapping information. In the actual operation, the physical-logical mapping information may primarily record the logical addresses, which has been specified above and thus not repeated hereinafter.

Moreover, in this exemplary embodiment, the host system 11 first compares the writing time information corresponding to the physical-logical mapping information, and then compares the sorting time information if the writing time information is the same. In another exemplary embodiment, a different determination method may be used to decide whether to sort the physical-logical mapping information according to the writing time information or the sorting time information.

As shown in the sorting table 1101, in this exemplary embodiment, the logical address LA(0) is mapped to the physical erasing unit PBA(0) and the physical erasing unit PBA(3), the logical addresses LA(1) and LA(2) are mapped to the physical erasing unit PBA(0) and the physical erasing unit PBA(2), the logical address LA(4) is mapped to the physical erasing unit PBA(1) and the physical erasing unit PBA(2), and the logical addresses LA(3) and LA(5) are mapped to the physical erasing unit PBA(1) and the physical erasing unit PBA(3). Thus, the memory control circuit unit 404 (or the memory management circuit 502) identifies the latest mapping relationship according to the time information. For example, regarding the mapping relationship of the logical address LA(0), the host system 11 determines that the mapping relationship of the logical address LA(0) being mapped to the physical erasing unit PBA(3) (the corresponding writing time information is 4) is the latest mapping relationship according to the writing time information, and thereby builds the logical-physical mapping information of the logical address LA(0) being mapped to the physical address PA(3-0) and records the same in a logical-physical mapping table 1102. Likewise, regarding the mapping relationship of the logical address LA(1), the host system 11 determines that the mapping relationship of the logical address LA(1) being mapped to the physical erasing unit PBA(2) (the corresponding writing time information is 3) is the latest mapping relationship according to the writing time information, and thereby builds the logical-physical mapping information of the logical address LA(1) being mapped to the physical address PA(2-0) and records the same in the logical-physical mapping table 1102. Accordingly, the host system 11 builds a plurality of logical-physical mapping information according to the sorting table 1101 of the sorted physical-logical address mapping information to generate the logical-physical mapping table 1102.

In this exemplary embodiment, the host system 11 scans the sorted physical-logical address mapping information one by one from old data to new data according to the sorting table 1101 and records the latest mapping relationship in the logical-physical mapping table 1102. For example, when the host system 11 scans the mapping information of the physical address PA(0-1) being mapped to the logical address LA(1), the mapping relationship of the logical address LA(1) being mapped to the physical address PA(0-1) is recorded in the logical-physical mapping table 1102. Then, when the host system 11 scans the mapping information of the physical address PA(2-0) being mapped to the logical address LA(1), the logical-physical mapping table 1102 is updated according to the mapping relationship of the logical address LA(1) being mapped to the physical address PA(2-0).

In another exemplary embodiment, the host system 11 may scan the sorted physical-logical address mapping information one by one from new data to old data according to the sorting table 1101 and records the latest mapping relationship in the logical-physical mapping table 1102. For example, when the host system 11 scans the mapping information of the physical address PA(2-2) being mapped to the logical address LA(4), the host system 11 determines that this mapping information is the latest mapping relationship corresponding to the logical address LA(4) and records the mapping relationship of the logical address LA(4) being mapped to the physical address PA(2-2) in the logical-physical mapping table 1102. Then, when the host system 11 scans the mapping information of the physical address PA(1-1) being mapped to the logical address LA(4), the host system 11 does not update the logical-physical mapping table 1102.

The memory control circuit unit 404 (or the memory management circuit 502) stores the corresponding physical-logical mapping information in the physical erasing unit of the written data after storing the written data in the physical erasing unit. However, if a system operational problem (e.g. power failure) occurs when the data is written, even though the written data has been stored in the physical erasing unit, the physical-logical mapping information may not be stored in the physical erasing unit yet. Consequently, the memory control circuit unit 404 (or the memory management circuit 502) cannot directly obtain the physical-logical mapping information of the physical erasing unit from the physical programming unit (e.g. the physical programming unit that is programmed last in the physical erasing unit) of this physical erasing unit.

Therefore, when the memory control circuit unit 404 (or the memory management circuit 502) cannot obtain the physical-logical mapping information from the physical programming unit of a certain physical erasing unit, the memory control circuit unit 404 (or the memory management circuit 502) reads the user data stored in the data bit area of this physical erasing unit and the logical address stored in the corresponding redundant bit area one by one in the unit of a specific data amount. The memory control circuit unit 404 (or the memory management circuit 502) may find the physical address to which the logical address is mapped from the currently built logical-physical mapping table and reads the user data stored in the physical address. The host system 11 then further compares the user data to determine whether to update the mapping information in the logical-physical mapping table.

Figure 12A:
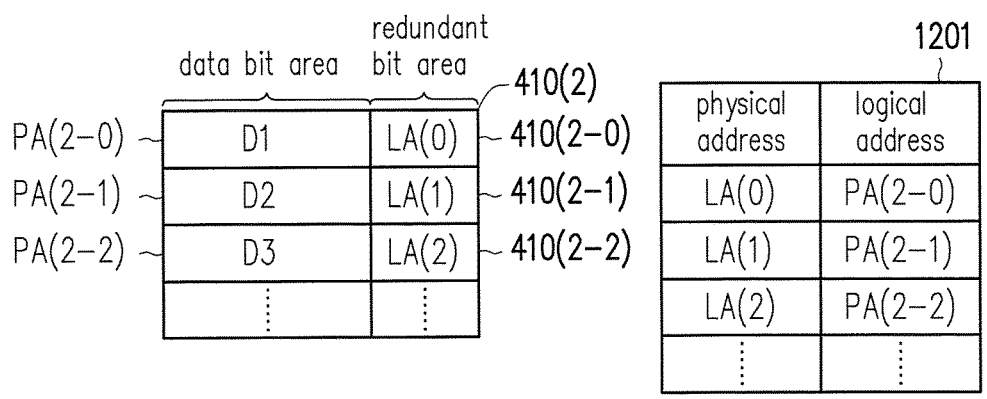
FIG. 12A and FIG. 12B are schematic diagrams showing comparing user data to update a logical-physical mapping table according to an exemplary embodiment.
Figure 12B:
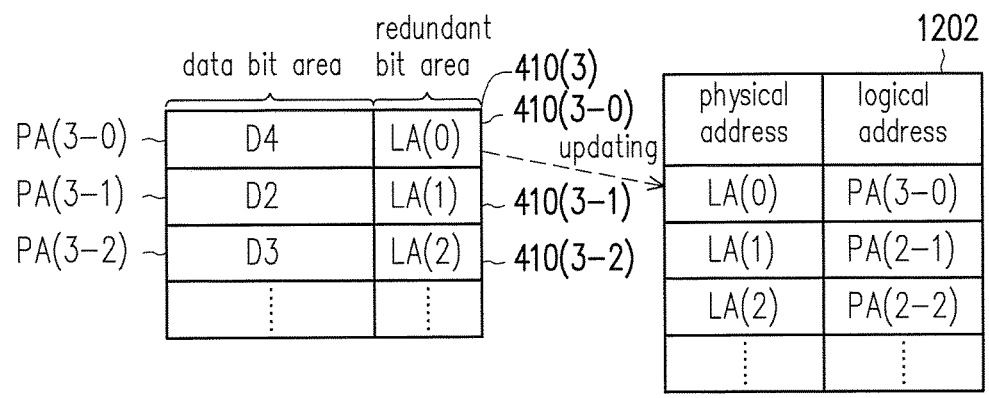

FIG. 12A and FIG. 12B are schematic diagrams showing comparing the user data to update the logical-physical mapping table according to an exemplary embodiment.

Referring to FIG. 12A, in this exemplary embodiment, the host system 11 has built the logical-physical mapping table 1201 according to the physical-logical mapping information read from the physical erasing unit. For physical erasing units that have not obtained the physical-logical mapping information, the host system 11 gives a read command to instruct the memory control circuit unit 404 (or the memory management circuit 502) to read the user data and logical addresses stored in these physical erasing units. In this exemplary embodiment, the user data is read in the unit of one physical programming unit. For example, referring to FIG. 12B, the physical erasing unit 410(3) does not store the corresponding physical-logical mapping information, and the memory control circuit unit 404 (or the memory management circuit 502) reads the user data and the corresponding logical address of the physical erasing unit 410(3). For example, the logical address LA(0) corresponds to the data D4, the logical address LA(1) corresponds to the data D2, and the logical address LA(2) corresponds to the data D3.

Referring to FIG. 12A and FIG. 12B, the memory control circuit unit 404 (or the memory management circuit 502) looks up the currently built logical-physical mapping table 1201 to find the physical address to which the read logical address is mapped. For example, in the logical-physical mapping table 1201, the logical address LA(0) is mapped to the physical address PA(2-0) (i.e. the physical programming unit 410(2-0) of the physical erasing unit 410(2)), and the memory control circuit unit 404 (or the memory management circuit 502) reads the data D1 stored in the physical programming unit 410(2-0).

The host system 11 compares the data D4 in the physical erasing unit 410(3) with the data D1 in the physical erasing unit 410(2) and determines that the data is different and that it is required to update the logical-physical mapping table 1201. The host system 11 updates the logical-physical mapping table 1201 according to the mapping relationship between the physical erasing unit 410(3) and the logical address LA(0). Referring to FIG. 12B, in an updated logical-physical mapping table 1202, the mapping information of the logical address LA(0) is updated to be mapped to the physical address PA(3-0) (i.e. the physical programming unit 410(3-0) of the physical erasing unit 410(3)).

Next, the memory control circuit unit 404 (or the memory management circuit 502) continues to compare the next user data in the physical erasing unit 410(3). For example, the data D2 in the physical programming unit 410(3-1) of the physical erasing unit 410(3) corresponds to the logical address LA(1). In the logical-physical mapping table 1202, the logical address LA(1) is mapped to the physical address PA(2-1) (i.e. the physical programming unit 410(2-1) of the physical erasing unit 410(2)), and the memory control circuit unit 404 (or the memory management circuit 502) reads the data D2 stored in the physical programming unit 410(2-1).

The host system 11 compares the data D2 in the physical erasing unit 410(3) with the data D2 in the physical erasing unit 410(2) and determines that the data is the same, and thus does not update the logical-physical mapping table 1202.

It should be noted that, in the logical-physical mapping table of this exemplary embodiment, it is merely an example to use the corresponding relationship between the logical address and the physical address to indicate the mapping relationship between the logical unit and the physical unit. In fact, the mapping relationship may also be indicated in different ways.

The logical-physical mapping table rebuilt through the exemplary embodiment described above includes the latest logical-physical mapping information. Thus, the host system 11 is able to correctly read the data in the rewritable non-volatile memory module 406 according to the rebuilt logical-physical mapping table.

In the above exemplary embodiment, the host system 11 executes the related operations in the process of rebuilding the logical-physical mapping table. The host system 11 may instruct the memory control circuit unit 404 (or the memory management circuit 502) to execute the corresponding operations by giving control commands. These control commands may be special commands, e.g. vendor command, that are different from the general commands. Therefore, the host system 11 may transmit a data rebuilding control code for rebuilding the data to the memory storage device 10, such that the memory control circuit unit 404 (or the memory management circuit 502) loads the data rebuilding control code to the buffer 508 for execution. The data rebuilding control code is then executed for the memory control circuit unit 404 (or the memory management circuit 502) to execute the corresponding operations according to the special commands of the host system 11. Nevertheless, in other exemplary embodiments, the memory storage device 10 may also execute the related operations in the process of rebuilding the logical-physical mapping table by executing a firmware code.

Further, in order to increase the speed of reading data, the rebuilt logical-physical mapping table may be loaded to the buffer member 508 of the memory storage device 10 for the memory control circuit unit 404 (or the memory management circuit 502) to directly access the logical-physical mapping table in the buffer 508 to read the user data stored in the rewritable non-volatile memory module 406. For example, the host system 11 may use the vendor command to re-store the mapping information in the rebuilt logical-physical mapping table in batches to the buffer 508 of the memory storage device 10. Then, the host system 11 may give a general read command to instruct the memory control circuit unit 404 (or the memory management circuit 502) to read the user data in the rewritable non-volatile memory module 406.

It should be noted that the mapping information written to the memory storage device 10 in each batch may be determined by a maximum data reading amount that can be read by the general read command. For example, the host system 11 may calculate the number of readable logical addresses according to a maximum data reading amount of the general read command, and write a corresponding number of mapping information in the logical-physical mapping table to the buffer of the memory storage device 10 according to the number of logical addresses as calculated. After the mapping information is written, the host system 11 may give a general read command to instruct the memory control circuit unit 404 (or the memory management circuit 502) to read the user data corresponding to the mapping information all together.

Figure 13:
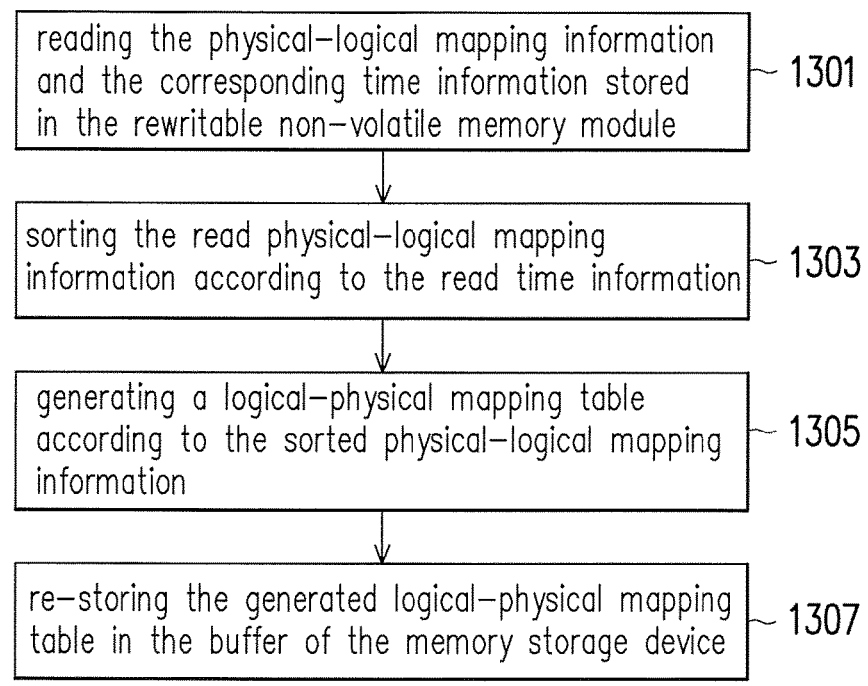
FIG. 13 is a flowchart showing a data rebuilding method according to an exemplary embodiment.

FIG. 13 is a flowchart showing a data rebuilding method according to an exemplary embodiment.

Referring to FIG. 13, in Step S1301, physical-logical mapping information and time information corresponding to the physical-logical mapping information stored in a rewritable non-volatile memory module are read. In Step S1303, the read physical-logical mapping information is sorted according to the read time information. In Step S1305, a logical-physical mapping table is generated according to the sorted physical-logical mapping information. In Step S1307, the generated logical-physical mapping table is re-stored in a buffer of a memory storage device.

In another exemplary embodiment, before Step S1301, the data rebuilding method further includes recording the physical-logical mapping information in the buffer of the memory storage device, wherein the physical-logical mapping information records a plurality of logical addresses of a plurality of physical erasing units. Then, the physical-logical mapping information recorded in the buffer and the time information corresponding to the physical-logical mapping information are stored in the rewritable non-volatile memory module.

In another exemplary embodiment, before Step S1301, the data rebuilding method further includes loading a data rebuilding control code to the buffer member of the memory storage device. The foregoing steps have been specifically explained above and thus are not repeated hereinafter.

To sum up, according to the invention, when the physical-logical mapping information is stored, the time information is stored as well, so as to identify new and old physical-logical mapping information. Then, if the logical-physical mapping table cannot be accessed correctly, the logical-physical mapping information is built based on the latest physical-logical mapping information, so as to correctly rebuild the logical-physical mapping table required for accessing the data, thereby correctly reading the user data in the rewritable non-volatile memory module. Moreover, the rebuilt logical-physical mapping table is re-stored in the buffer of the memory storage device for improving the efficiency of data reading.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A data rebuilding method for a memory storage device comprising a rewritable non-volatile memory module comprising a plurality of physical erasing units, the data rebuilding method comprising:
    reading a plurality of physical-logical mapping information and a plurality of time information corresponding to the plurality of physical-logical mapping information stored in the rewritable non-volatile memory module;
    sorting the plurality of physical-logical mapping information according to the plurality of time information;
    building a plurality of logical-physical mapping information according to the sorted plurality of physical-logical mapping information to generate a logical-physical mapping table; and
    storing the logical-physical mapping table into a buffer of the memory storage device,
    wherein the physical-logical mapping information comprises a first physical-logical mapping information and a second physical-logical mapping information, wherein the step of building the logical-physical mapping information according to the sorted physical-logical mapping information to generate the logical-physical mapping table further comprises:
    updating the logical-physical mapping table according to the second physical-logical mapping information if the first physical-logical mapping information and the second physical-logical mapping information comprise the same logical address and the time information of the second physical-logical mapping information is sorted after the time information of the first physical-logical mapping information.

2. The data rebuilding method according to claim 1, wherein the step of storing the logical-physical mapping table into the buffer of the memory storage device comprises:
    calculating a number of logical addresses according to a maximum data reading amount corresponding to a read command, and writing a plurality of logical-physical mapping information of the logical-physical mapping table in batches to the buffer of the memory storage device according to the number of the logical addresses.

3. The data rebuilding method according to claim 1, wherein each of the plurality of time information comprises a writing time information and a sorting time information.

4. The data rebuilding method according to claim 3, wherein the physical-logical mapping information further comprises a third physical-logical mapping information and a fourth physical-logical mapping information, wherein the step of sorting the plurality of physical-logical mapping information according to the plurality of time information comprises:
    sorting the plurality of physical-logical mapping information according to the plurality of writing time information; and
    sorting the third physical-logical mapping information and the fourth physical-logical mapping information according to a first sorting time information of the third physical-logical mapping information and a second sorting time information of the fourth physical-logical mapping information if a first writing time information of the third physical-logical mapping information and a second writing time information of the fourth physical-logical mapping information are the same.

5. The data rebuilding method according to claim 1, wherein each of the physical erasing units comprises a plurality of physical programming units, which comprise a first physical programming unit and a second physical programming unit, wherein after the step of generating the logical-physical mapping table, the data rebuilding method further comprises:
    reading a first information and a first logical address of the first physical programming unit, wherein a fifth physical-logical mapping information to which the first physical programming unit corresponds is not yet stored in the rewritable non-volatile memory module;
    reading a second information in the second physical programming unit to which the first logical address is mapped according to the logical-physical mapping table; and
    updating the first logical address in the logical-physical mapping table to map to the first physical programming unit if the first information and the second information are different.

6. The data rebuilding method according to claim 1, wherein before reading the physical-logical mapping information stored in the rewritable non-volatile memory module, the data rebuilding method further comprises:
    loading a data rebuilding control code from a host system to the buffer of the memory storage device, wherein the data rebuilding control code is executed to read the plurality of physical-logical mapping information stored in the rewritable non-volatile memory module according to at least one command of the host system.

7. The data rebuilding method according to claim 1, wherein the plurality of physical-logical mapping information are stored in a data bit area in at least one physical erasing unit of the rewritable non-volatile memory module, and the plurality of time information are stored in a redundant bit area in the at least one physical erasing unit.

8. The data rebuilding method according to claim 1, further comprising:
recording the plurality of physical-logical mapping information in the buffer; and
storing the plurality of physical-logical mapping information recorded in the buffer and the plurality of time information corresponding to the physical-logical mapping information in the rewritable non-volatile memory module.

9. A memory control circuit unit disposed in a memory storage device for controlling a rewritable non-volatile memory module of the memory storage device, wherein the rewritable non-volatile memory module comprises a plurality of physical erasing units, the memory control circuit unit comprising:
a host interface configured to couple to a host system;
a memory interface configured to couple to the rewritable non-volatile memory module; and
a memory management circuit coupled to the host interface and the memory interface,
wherein the memory management circuit reads a plurality of physical-logical mapping information and a plurality of time information corresponding to the plurality of physical-logical mapping information stored in the rewritable non-volatile memory module,
wherein the memory management circuit sorts the plurality of physical-logical mapping information according to the plurality of time information,
wherein the memory management circuit builds a plurality of logical-physical mapping information according to the sorted plurality of physical-logical mapping information to generate a logical-physical mapping table, and
wherein the memory management circuit stores the logical-physical mapping table into a buffer of the memory storage device,
wherein the physical-logical mapping information comprises a first physical-logical mapping information and a second physical-logical mapping information, and the memory management circuit updates the logical-physical mapping table according to the second physical-logical mapping information if the first physical-logical mapping information and the second physical-logical mapping information comprise the same logical address and the second physical-logical mapping information is sorted after the first physical-logical mapping information.

10. The memory control circuit unit according to claim 9, wherein the memory management circuit calculates a number of logical addresses according to a maximum data reading amount corresponding to a read command, and stores a plurality of logical-physical mapping information of the logical-physical mapping table in batches into the buffer of the memory storage device according to the number of the logical addresses.

11. The memory control circuit unit according to claim 9, wherein each of the plurality of time information comprises a writing time information and a sorting time information.

12. The memory control circuit unit according to claim 11, wherein the physical-logical mapping information comprises a third physical-logical mapping information and a fourth physical-logical mapping information,
wherein the memory management circuit sorts the plurality of physical-logical mapping information according to the plurality of writing time information, and
wherein the memory management circuit sorts the third physical-logical mapping information and the fourth physical-logical mapping information according to a first sorting time information of the third physical-logical mapping information and a second sorting time information of the fourth physical-logical mapping information if a first writing time information of the third physical-logical mapping information and a second writing time information of the fourth physical-logical mapping information are the same.

13. The memory control circuit unit according to claim 9, wherein each of the physical erasing units comprises a plurality of physical programming units, which comprise a first physical programming unit and a second physical programming unit,
wherein the memory management circuit reads a first information and a first logical address of the first physical programming unit, wherein a fifth physical-logical mapping information to which the first physical programming unit corresponds is not yet stored in the rewritable non-volatile memory module,
wherein the memory management circuit reads a second information in the second physical programming unit to which the first logical address is mapped according to the logical-physical mapping table, and
wherein the memory management circuit updates the first logical address in the logical-physical mapping table to map to the first physical programming unit if the first information and the second information are different.

14. The memory control circuit unit according to claim 9, wherein the memory management circuit loads a data rebuilding control code from the host system to the buffer of the memory storage device, and
wherein the data rebuilding control code is executed such that the memory management circuit reads the plurality of physical-logical mapping information stored in the rewritable non-volatile memory module according to at least one command of the host system.

15. The memory control circuit unit according to claim 9, wherein the plurality of physical-logical mapping information are stored in a data bit area in at least one physical erasing unit of the rewritable non-volatile memory module, and the plurality of time information are stored in a redundant bit area in the at least one physical erasing unit.

16. The memory control circuit unit according to claim 9, wherein the memory management circuit records the plurality of physical-logical mapping information in the buffer, and stores the physical-logical mapping information recorded in the buffer and the plurality of time information corresponding to the physical-logical mapping information in the rewritable non-volatile memory module.

17. A data rebuilding system, comprising:
a host system comprising a data rebuilding unit;
a memory storage device, comprising:
a connection interface unit coupled to the host system;
a rewritable non-volatile memory module comprising a plurality of physical erasing units; and
a memory control circuit unit coupled to the connection interface unit and the rewritable non-volatile memory module,
wherein the data rebuilding unit transmits at least one read command to the memory storage device, and the memory control circuit unit reads a plurality of physical-logical mapping information and a plurality of time information corresponding to the plurality of physical-logical mapping information stored in the rewritable non-volatile memory module according to the at least one read command to respond to the at least one read command, wherein the data rebuilding unit sorts the plurality of physical-logical mapping information according to the plurality of time information, wherein the data rebuilding unit builds a plurality of logical-physical mapping information according to the sorted plurality of physical-logical mapping information to generate a logical-physical mapping table, and wherein the data rebuilding unit stores the logical-physical mapping table into a buffer of the memory storage device, wherein the physical-logical mapping information comprises a first physical-logical mapping information and a second physical-logical mapping information, and the data rebuilding unit updates the logical-physical mapping table according to the second physical-logical mapping information if the first physical-logical mapping information and the second physical-logical mapping information comprise the same logical address and the second physical-logical mapping information is sorted after the first physical-logical mapping information.

18. The data rebuilding system according to claim 17, wherein the data rebuilding unit calculates a number of logical addresses according to a maximum data reading amount corresponding to a read command, and writes a plurality of logical-physical mapping information of the logical-physical mapping table in batches into the buffer of the memory storage device according to the number of the logical addresses.

19. The data rebuilding system according to claim 17, wherein each of the plurality of time information comprises a writing time information and a sorting time information.

20. The data rebuilding system according to claim 19, wherein the physical-logical mapping information comprises a third physical-logical mapping information and a fourth physical-logical mapping information, wherein the data rebuilding unit sorts the plurality of physical-logical mapping information according to the plurality of writing time information, and wherein the data rebuilding unit sorts the third physical-logical mapping information and the fourth physical-logical mapping information according to a first sorting time information of the third physical-logical mapping information and a second sorting time information of the fourth physical-logical mapping information if a first writing time information of the third physical-logical mapping information and a second writing time information of the fourth physical-logical mapping information are the same.

21. The data rebuilding system according to claim 17, wherein each of the physical erasing units comprises a plurality of physical programming units, which comprise a first physical programming unit and a second physical programming unit, wherein the data rebuilding unit transmits a first read command to the memory storage device, and the memory control circuit unit reads a first information and a first logical address of the first physical programming unit according to the first read command to respond to the first read command, wherein a fifth physical-logical mapping information to which the first physical programming unit corresponds is not yet stored in the rewritable non-volatile memory module, wherein the data rebuilding unit transmits a second read command to the memory storage device according to the first logical address and the logical-physical mapping table, and the memory control circuit unit reads a second information in the second physical programming unit to which the first logical address is mapped according to the second read command to respond to the second read command, and wherein the data rebuilding unit updates the first logical address in the logical-physical mapping table to map to the first physical programming unit if the first information and the second information are different.

22. The data rebuilding system according to claim 17, wherein the data rebuilding unit transmits a data rebuilding control code to the memory storage device, and the memory control circuit unit loads the data rebuilding control code to the buffer of the memory storage device, and wherein the data rebuilding control code is executed such that the memory control circuit unit reads the plurality of physical-logical mapping information stored in the rewritable non-volatile memory module according to the at least one read command of the data rebuilding unit.

23. The data rebuilding system according to claim 17, wherein the plurality of physical-logical mapping information are stored in a data bit area in at least one physical erasing unit of the rewritable non-volatile memory module, and the plurality of time information are stored in a redundant bit area in the at least one physical erasing unit.

24. The data rebuilding system according to claim 17, wherein the memory control circuit unit records the plurality of physical-logical mapping information in the buffer, and stores the plurality of physical-logical mapping information recorded in the buffer and the plurality of time information corresponding to the physical-logical mapping information in the rewritable non-volatile memory module.

\* \* \* \* \*